United States Patent
Park et al.

(10) Patent No.: US 6,612,392 B2
(45) Date of Patent: Sep. 2, 2003

(54) STEER-BY-WIRE SYSTEM USING SEMI-ACTIVE ACTUATOR

(75) Inventors: Youngjin Park, Taejon (KR); Inyong Jung, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 10/054,651

(22) Filed: Jan. 22, 2002

(65) Prior Publication Data

US 2002/0108804 A1 Aug. 15, 2002

(30) Foreign Application Priority Data

Feb. 10, 2001 (KR) .......................................... 2001-6629

(51) Int. Cl.⁷ ................................................ B62D 5/00
(52) U.S. Cl. ........................ 180/402; 180/422; 701/41; 701/42
(58) Field of Search ................................ 180/402, 403, 180/421, 422, 443, 446; 701/41, 42

(56) References Cited

U.S. PATENT DOCUMENTS

| 5,198,981 A | * | 3/1993 | Collier-Hallman et al. ... 701/42 |
| 5,276,620 A | * | 1/1994 | Bottesch ..................... 701/41 |
| 5,732,791 A | * | 3/1998 | Pinkos et al. ................ 180/444 |
| 6,079,513 A | * | 6/2000 | Nishizaki et al. ........... 180/402 |
| 6,219,604 B1 | * | 4/2001 | Dilger et al. ................. 701/41 |
| 6,389,343 B1 | * | 5/2002 | Hefner et al. ................. 701/41 |

* cited by examiner

*Primary Examiner*—Lesley D. Morris
*Assistant Examiner*—L. Lum
(74) *Attorney, Agent, or Firm*—Allen, Dyer, Doppelt, Milbrath & Gilchrist, P.A.

(57) ABSTRACT

A steer-by-wire system uses a semi-active actuator in which a wheel steering motor operates vehicle wheels when a steering wheel is rotated. The steering system includes: a steering operator unit having a steering column with one end vertically connected to the center of the steering wheel, a torsion spring connected between the other end of the steering column and a vehicle body via jigs mounted to both ends thereof, a magneto-rheological brake for providing steering reaction force according to the amount of current, and rotation angle sensor coupled with one end of the steering column for detecting rotation of the steering wheel, and a torque sensor coupled with one end of the steering column for detecting torque of the steering wheel; a current regulator for controlling resistance force against rotation of the magneto-rheological brake.581 A controller is provided for controlling the current regulator according to torque data from the torque sensor, and controlling the wheel steering motor according to rotational displacement data from the rotation angle sensor.

13 Claims, 9 Drawing Sheets

STEER-BY-WIRE SYSTEM USING SEMI-ACTIVE ACTUATOR

BACKGROUND OF THE INVENTION

1. Field of the Invention

The present invention relates generally to a steering wheel used in an indoor facility for driving practice, a reactive wheel of a game system and a steering wheel of a vehicle, and more particularly to a steer-by-wire system, which employs a brake using magneto-rheological fluid as an actuator to provide a driver with smooth feeling, and to escape improper and potentially dangerous acceleration of the steering wheel by the active actuator when driver's hands are released from steering wheel abruptly.

2. Description of the Prior Art

As well known to those skilled in the art, a driver is able to sense information on vehicle conditions and road surface conditions through a mechanical connection between a steering wheel and wheels of the vehicle. However, since a steer-by-wire system does not have any mechanical connection, an additional control is required to transmit suitable steering reaction force to the driver.

Figure 1:
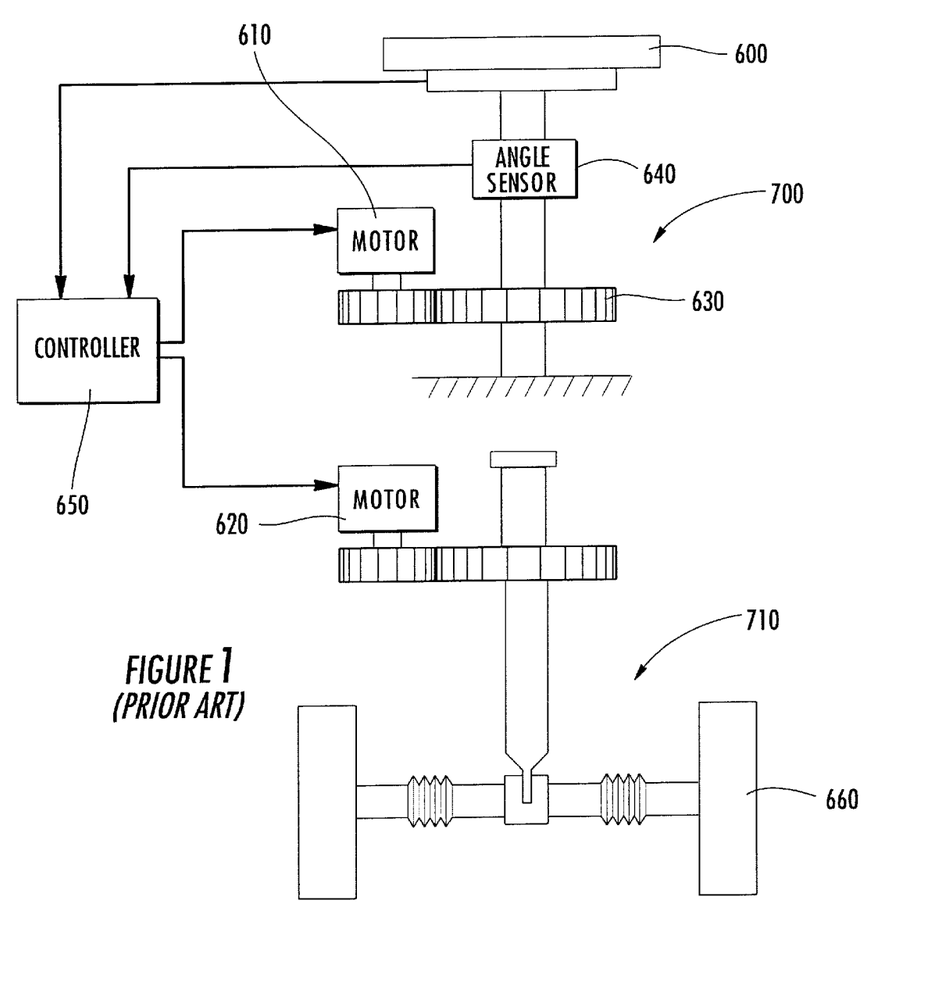
FIG. 1 shows a general structure of a steer-by-wire system using an active actuator of the prior art.

FIG. 1 shows a general structure of a steer-by-wire system using an active actuator of the prior art.

Referring to FIG. 1, in the steer-by-wire system of the prior art, there is no mechanical connection between a steering operator unit 700 and a steering actuator unit 710. When the steering operator unit 700 receives a steering input from a steering wheel 600, a motor of the steering actuator unit 710 turn the vehicle's wheels 660 accordingly.

In other words, the steering system has a first steering column which is connected to the steering wheel 600 and is rotated by the same, and a second steering column which is installed at a distance from the first steering wheel and rotatable in situ. A motor 610 for providing steering reaction force to the driver via the steering wheel 600 is coupled with the first steering column via a gear 630. A motor 620 for steering the wheels 660 is engaged into the second steering column via a gear 630.

Also, an angle sensor 640 for detecting a rotation angle of the steering wheel 600 and a torque sensor for detecting torque applied to the steering wheel 600 are provided at one end of the first steering column. A controller 650 controls the motor 620 in response to signals applied from the steering wheel angle sensor 640 so as to regulate a rotation angle of the vehicle wheels 660. Also, the controller 650 controls the wheel steering motor 610 so that the steering wheel can be manipulated with a feeling similar to that in the mechanical steering system.

In the steer-by-wire system of the prior art configured as above, the steering wheel 600 is required to serve as a conventional steering wheel for changing the direction of the travel of a vehicle according to a steering input of the driver, and at the same time to make the driver feel a suitable amount of steering force. Therefore, in addition to the above steering wheel 600, the steering system needs a rotation angle sensor for measuring an angle inputted by the driver and transmitting the same to the controller, and a steering wheel actuator for transmitting steering reaction force to the driver. Here, the steering wheel actuator is a very important component for influencing the controllability and stability of the steering wheel 600, and employs a motor.

However, when a system with low impedance such as the steering wheel 600 of the steer-by-wire system is force-feedback controlled by using an active actuator such as the motor, the steering wheel 600 can be accelerated by the motor or the actuator at the moment that the steering input is removed. Then, the stability of the system cannot be ensured. Therefore, an active actuator such as the motor is not suitable for the steering wheel 600 of the steering system, where stability is important. Also, in using an active actuator such as a motor, an oscillatory torque is transmitted to the steering wheel 600. Then, the driver feels vibration from the steering wheel that causes the driver to feel uncomfortable.

SUMMARY OF THE INVENTION

Accordingly, the present invention has been made keeping in mind the above problems occurring in the prior art, and an object of the present invention is to provide a steer-by-wire system using a semi-active actuator, in which a suitable amount of steering reaction force is supplied to a steering wheel by using a magneto-rheological brake as the semi-active actuator, by which stability can be promoted even if a driver input is removed, and a driver can feel smoothness in steering.

It is another object of the invention to provide a steer-by-wire system using a semi-active actuator which supplies steering reaction force to a steering wheel in response to driving conditions without a mechanical connection with wheels of a vehicle, and thus can be applied to the virtual reality system industry and the game industry.

In order to accomplish the above objects, the present invention provides a steer-by-wire system using a semi-active actuator, in which a wheel steering motor operates vehicle wheels when a steering wheel is rotated, the system comprising: a steering operator unit having a steering column with one end vertically connected to the center of the steering wheel, a torsion spring means connected between the other end of the steering column and a vehicle body via jigs mounted to both ends thereof, a magneto-rheological brake for providing steering reaction force according to the amount of current, a rotation angle sensor coupled with one end of the steering column for detecting rotation of the steering wheel, and a torque sensor coupled with one end of the steering column for detecting steering torque; a current regulator for controlling resistance force against rotation of the magneto-rheological brake; and a controller for controlling the current regulator according to torque data from the torque sensor, and controlling the wheel steering motor 110 according to rotational displacement data from the rotation angle sensor.

It is preferred that the magneto-rheological brake has a rotor fixed to the outer periphery of the steering column, a plurality of cores spaced apart from the rotor by a predetermined interval and wound with coils, and a housing spaced apart from the rotor by a predetermined interval for receiving the rotor and the plurality of cores, wherein the rotor, the plurality of cores and the housing define a space for containing a magneto-rheological fluid.

It is also preferred that the housing is fixed to the vehicle body to support rotation of the steering wheel, and the torsion spring means has a double structure of springs connected in parallel, in which one of the springs has diameter and spiral direction different from those of the other.

Also, it is preferred that the jigs are a pair shaped as a column, one of the jigs being centrally fixed to the steering wheel, and the other one of the jigs being fixed to the vehicle body.

In order to accomplish the above objects, the present invention further provides a steer-by-wire system using a semi-active actuator, in which a wheel steering motor operates vehicle wheels when a steering wheel is rotated, the system comprising: a steering operator unit having a first steering column vertically connected to the center of the steering wheel, a second steering column connected to the first steering column, a first torsion spring means connected between the first steering column and the second steering column via first jigs mounted to both ends thereof, a second torsion spring means connected between the second steering column and a vehicle body via second jigs mounted to both ends thereof, a first magneto-rheological brake for comparing torque by the first torsion spring means with the reference steering torque and providing resistance force to compensate for an error, a second magneto-rheological brake mounted to the second steering column for regulating torque by the first torsion spring means, a first rotation angle sensor coupled with one end of the first steering column for detecting angle displacement of the steering wheel, a second rotation angle sensor coupled with one end of the second steering column for detecting angle displacement of the second steering column, and a torque sensor coupled with one end of the first steering column for detecting steering torque; a current regulating unit having a first current regulator for controlling resistance force against rotation of the first magneto-rheological brake, and a second current regulator for controlling resistance force against rotation of the second magneto-rheological brake; and a controller for receiving data of the torque sensor 40, the first rotation angle sensor and the second rotation angle sensor to control the amount of current of the first current regulator and the second regulator and to control the wheel steering motor.

It is preferred that the first magneto-rheological brake has a rotor fixed to the outer periphery of the first steering column, a plurality of cores spaced apart from the rotor by a predetermined interval and wound with coils, and a housing spaced apart from the rotor by a predetermined interval for receiving the rotor and the plurality of cores, the rotor, the plurality of cores and the housing defining a space for containing a magneto-rheological fluid; and the second magneto-rheological brake has a rotor fixed to the outer periphery of the second steering column, a plurality of cores spaced apart from the rotor by a predetermined interval and wound with coils, and a housing spaced apart from the rotor by a predetermined interval for receiving the rotor and the plurality of cores, the rotor, the plurality of cores and the housing defining a space for containing a magneto-rheological fluid.

It is also preferred that the housing is fixed to the vehicle body to support rotation of the steering wheel, and the first torsion spring means has a double structure of springs connected in parallel, in which one of the springs has a diameter and a spiral direction different from those of the other.

Also, it is preferred that the second torsion spring means has a double structure of springs connected in parallel, in which one of the springs has a diameter and a spiral direction different from those of the other, and the second torsion spring means has stiffness lower than that of the first torsion spring means Preferably, the first jigs are a pair shaped as columns, in which one of the first jigs is centrally fixed to the steering wheel, the other one of the first jigs is centrally fixed to the vehicle body.

Preferably also, the second jigs are a pair shaped as columns, in which one of the second jigs is centrally fixed to the steering wheel, the other one of the second jigs is centrally fixed to the vehicle body.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The same reference numerals are used throughout the different drawings to designate the same or similar components.

As one of major characteristics of the invention, vehicle wheels are steered by rotating a steering wheel without a connecting structure between the wheels and the steering wheel. Also, a magneto-rheological brake as a semi-active actuator provides the steering wheel with resistance force against rotation as a form of steering reaction force so that driving condition information can be transmitted to a driver. Accordingly, the steering wheel maintains a suitable degree of steering reaction force according to driving condition information such as an angular velocity of rotation and the direction of rotation so that the driver can be provided with stability and smoothness in steering.

Embodiment 1

First, the first embodiment of the invention will be described in reference to FIG. 2.

Figure 2:
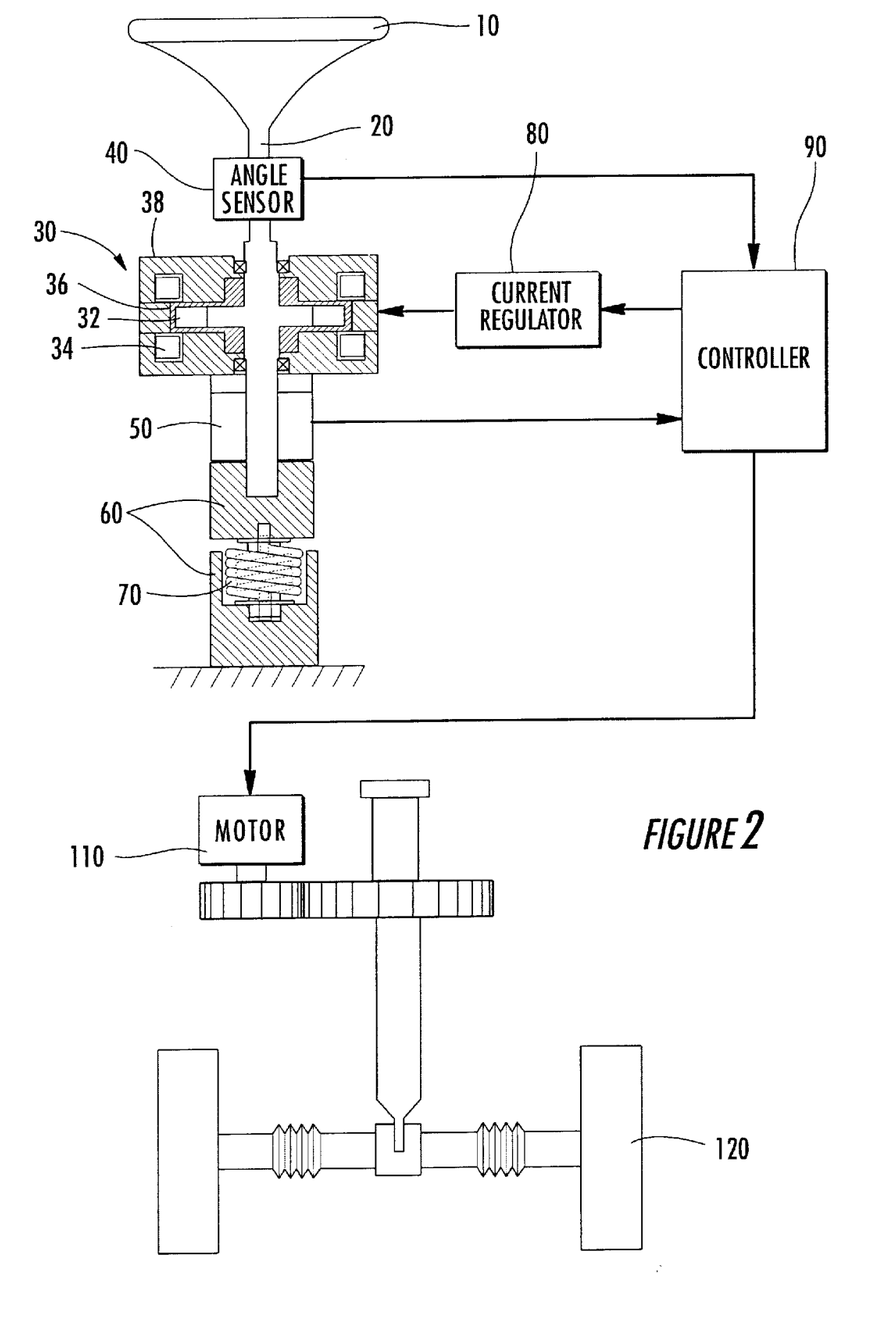
FIG. 2 shows a general structure of a steer-by-wire system using a semi-active actuator according to the first embodiment of the invention.
Figure 3:
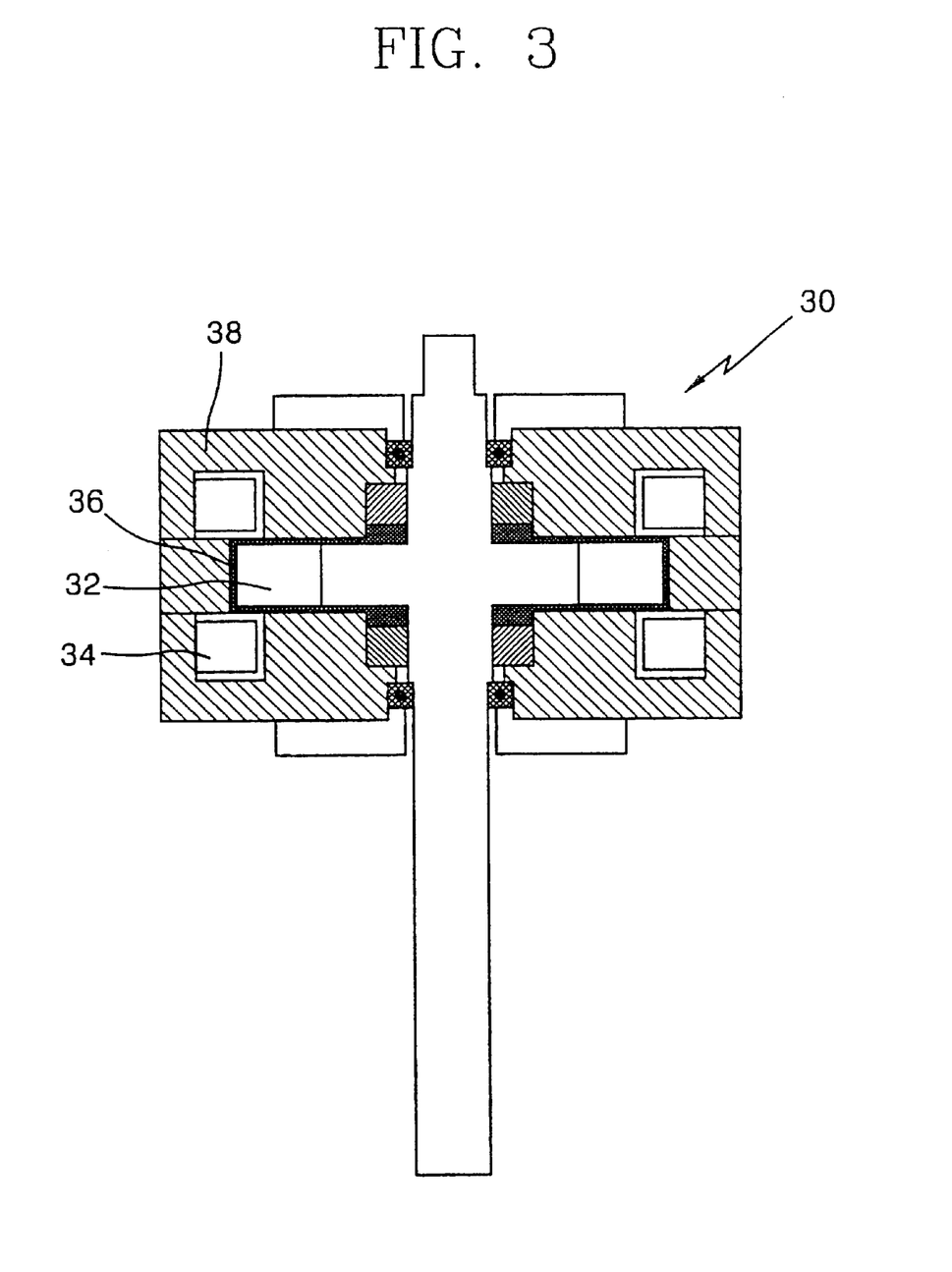
FIG. 3 is a sectional view for showing a magneto-rheological brake of the steer-by-wire system using the semi-active actuator according to the second embodiment of the invention.
Figure 4:
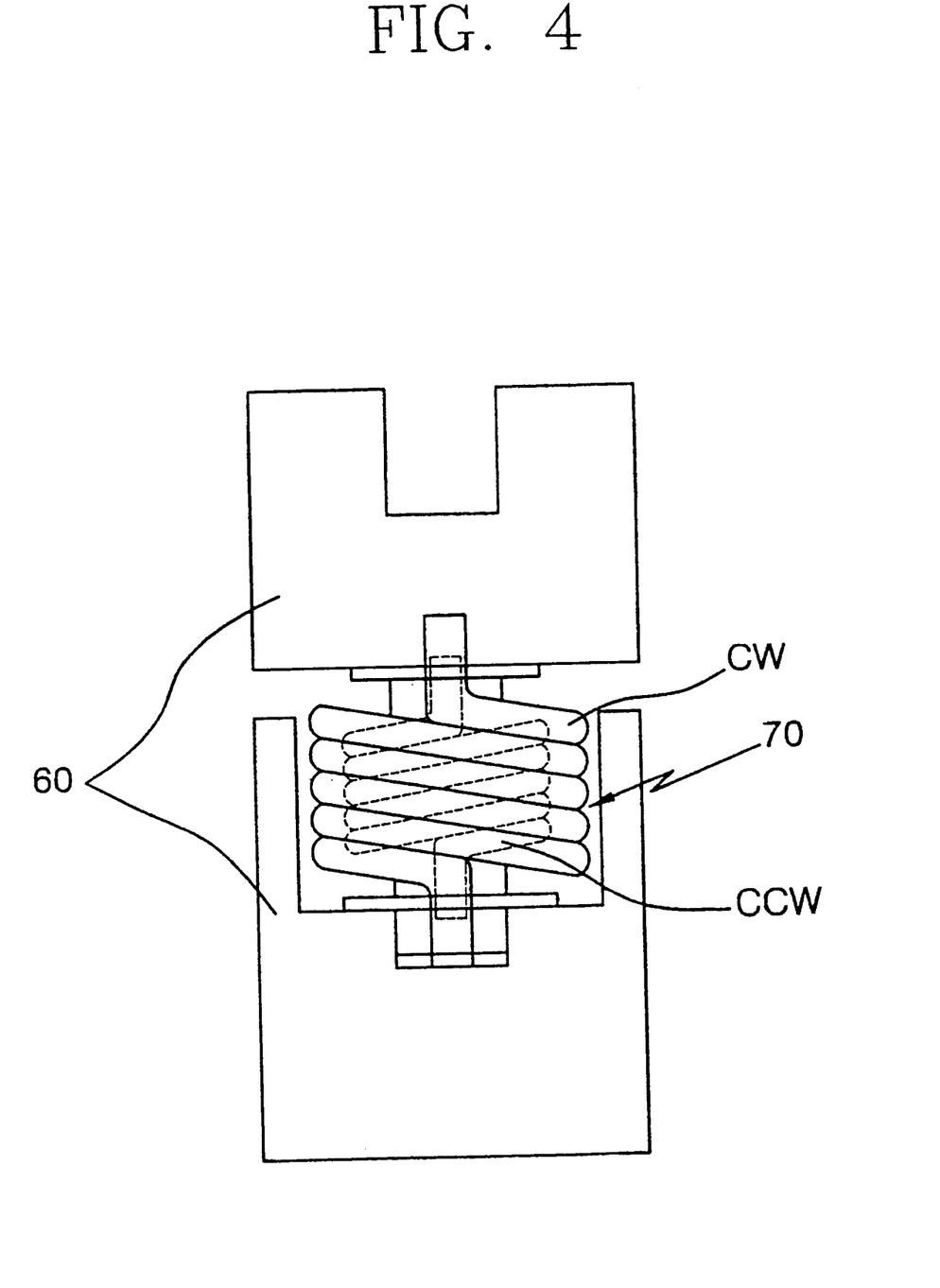
FIG. 4 is a plan view of torsion springs of the electric steering wheel using the semi-active actuator according to the first embodiment of the invention.

FIG. 2 shows a general structure of a steer-by-wire system using a semi-active actuator according to the first embodiment of the invention, FIG. 3 is a sectional view for showing a magneto-rheological brake of the steer-by-wire system using the semi-active actuator according to the second embodiment of the invention, and FIG. 4 is a plan view of torsion springs of the steering wheel using the semi-active actuator according to the first embodiment of the invention.

As shown in FIG. 2, a rim-shaped steering wheel 10 is provided, and the driver holds and rotates the steering wheel 10 clockwise and counter clockwise to input steering operations. A rod-shaped steering column 20 is vertically connected to the center of the steering wheel 10 for supporting rotation of the steering wheel 10. A magneto-rheological brake 30 is installed in a middle area of the steering column 20 for generating resistance force against rotation to provide steering reaction force to the driver, and includes a rotor 32, a plurality of cores 34 and a magneto-rheological fluid 36.

In the magneto-rheological brake 30, the rotor 32 is fixed to a protruded outer periphery of the steering column 20. The plurality of cores 34 are situated at both sides of the rotor 32 to be spaced apart from the sides of the rotor 32 by a predetermined interval, and wound with coils. A housing 38 is situated to be spaced apart from the rotor 32 by a predetermined interval for receiving the rotor 32 and the plurality of cores 34, and defines a space together with the rotor 32 and the core 34 where the magneto-rheological fluid 36 is contained.

Here, the magneto-rheological fluid or MRF 36 is a non-colloidal fluid in which magnetic particles of several microns are dispersed into a non-conducting solvent such as silicon oil or mineral oil. When a magnetic field is not applied, the magnetic particles in the MRF 36 are dispersed to have the properties of Newtonian fluids. If a magnetic field is applied, the magnetic particles are aligned with the applied magnetic field in a parallel direction so that the MRF 36 can have a resisting force against sheering force or flow stress. The MRF 36 overcomes disadvantages of an electro-rheological fluid(ERF) such as low yield strength, narrow applicable temperature range and sensitivity to impurities while maintaining the advantage of rapid response time.

Also, the steering system has a torque sensor 40 coupled with one end of the steering column for detecting the amount of torque, which is the resistance force against rotation induced from the magneto rheological brake 30 and provided to the driver as steering reaction force. A rotation angle sensor 50 is coupled with one end of the steering wheel 20 to detect rotation of the steering wheel 10.

The steering system has torsion springs 70 between the other end of the steering wheel 20 and a vehicle body. Column-shaped jigs 60 are mounted to both ends of the torsion springs 70. One of the jigs 60 is attached to the steering wheel 20 and the other one of the jigs 60 is attached to the vehicle body so that the steering wheel 10 is applied with restoring force toward the original position due to elasticity of the torsion springs 70 when the driver rotates the steering wheel 10.

Also, as shown in FIG. 4, the torsion springs 70 has a double spring structure of two springs connected in parallel with different diameters, in which one spring is wound clockwise (CW) and the other one is wound counter clockwise (CCW) so that the spiral direction of one spring is different from that of the other. Since the springs 70 have the double spring structure, restoring force can be provided in each direction when the steering wheel 10 is rotated clockwise or counter clockwise.

Figure 5A:
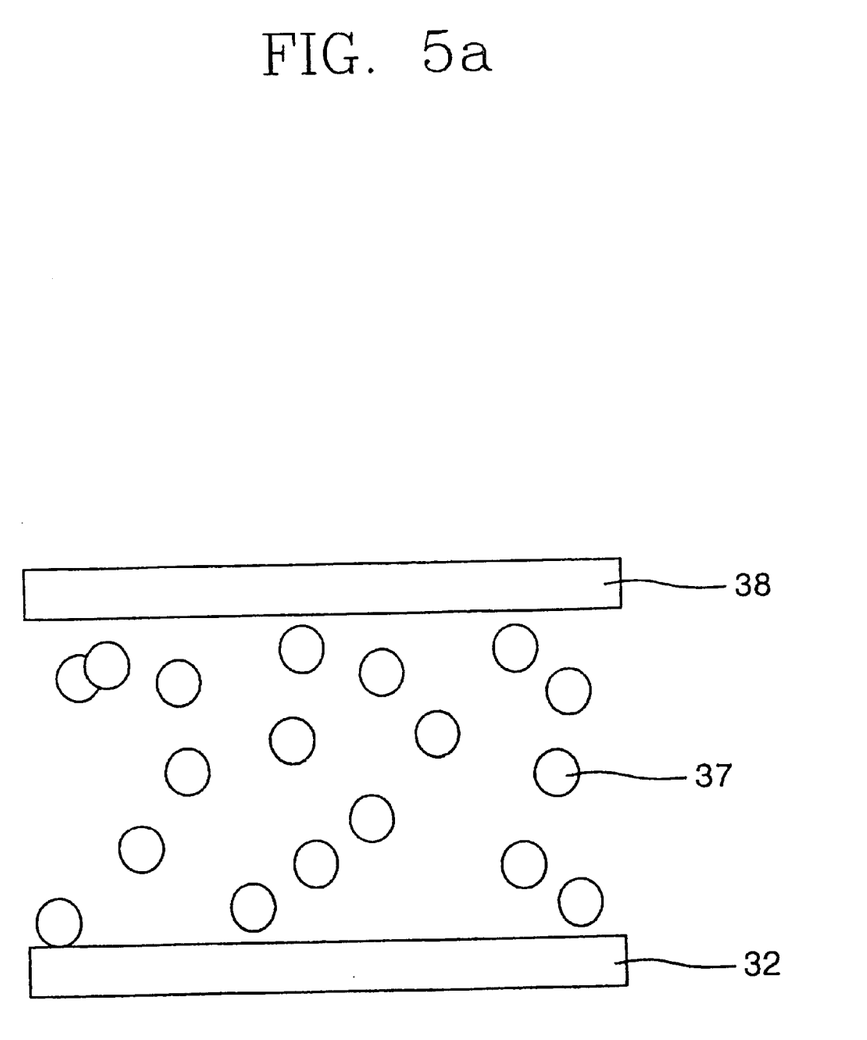
FIG. 5A shows a condition before current flows through a magneto-rheological fluid according to the first embodiment of the invention.
Figure 5B:
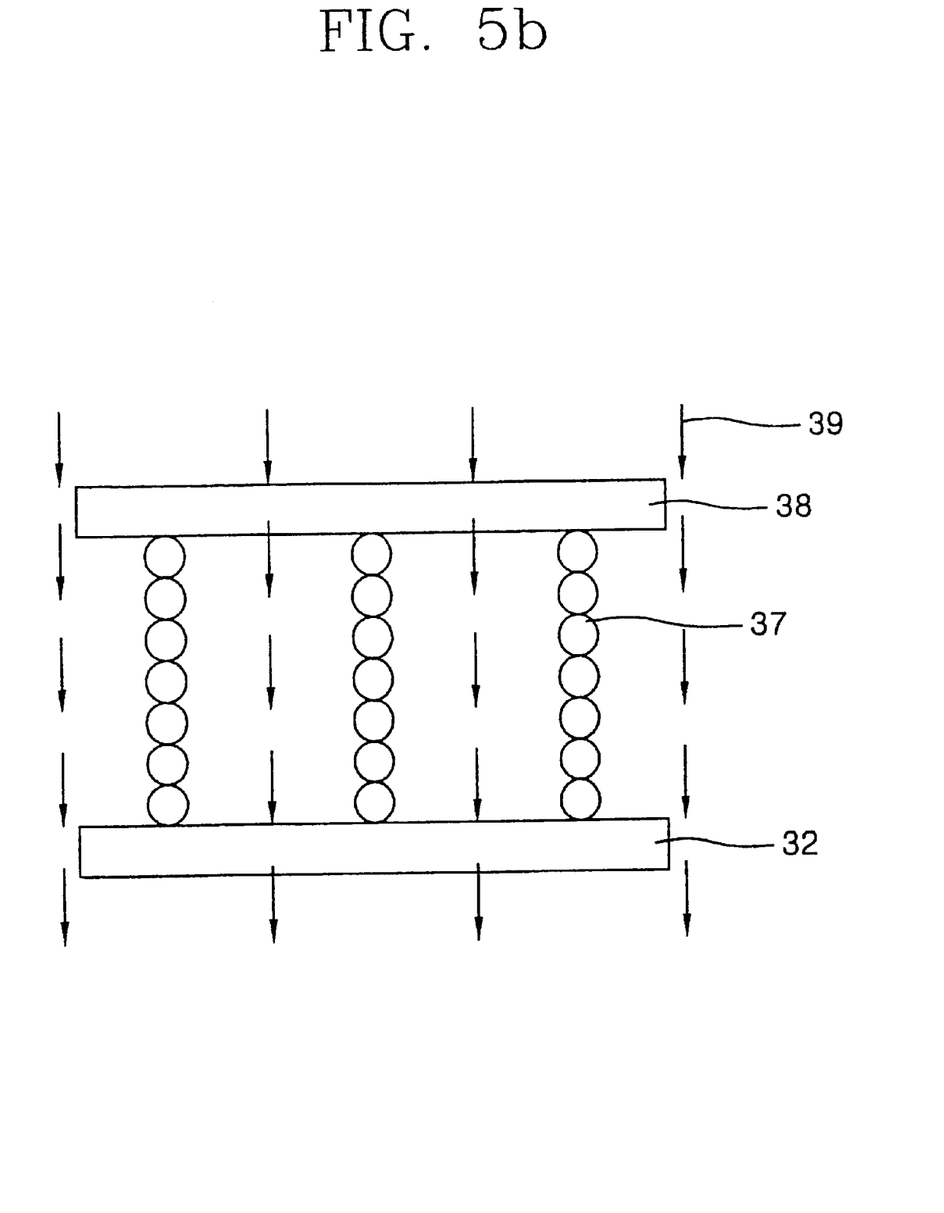
FIG. 5B shows a condition when current flows through the magneto-rheological fluid according to the first embodiment of the invention.

FIG. 5A shows a condition before current flows through the magneto-rheological fluid 36 according to the first embodiment of the invention, and FIG. 5B shows a condition when current flows through the magneto-rheological fluid 36 according to the first embodiment of the invention.

The housing 38 is fixed to the vehicle body, and when the steering wheel 10 is rotated, the rotor 32 is rotated also within the housing 38 in which the magneto-rheological fluid 36 is contained. Here, when the cores 34 are not applied with current, the magneto-rheological fluid 36 is in a Newton fluid state as shown in FIG. 5A, in which the magnetic particles 37 are separated from one another, and do not apply resistance force to the rotation of the rotor 32.

However, when the cores 34 are applied with current, the magnetic particles 37 of the magneto-rheological fluid 36 are aligned along the direction parallel to the magnetic field, as shown in FIG. 5B, so that the magneto-rheological fluid 36 behaves as a Bingham fluid. A bonding force among the magnetic particles 37 is proportional to the amount of current so that the rotor 32 is applied with a larger amount of resistance force against rotation as current flows in a larger amount.

In other words, if the amount of current is increased or decreased according to driving condition information, resistance force against rotation of the rotor 32 is directly transmitted to the steering wheel 10 so that the driver can feel resistance force against rotation of the rotor 32 through steering reaction force.

In FIG. 2, current is supplied to the magneto-rheological brake 30 through a current regulator 80, and the amount of current supplied by the current regulator 80 is controlled by a controller 90. Also, the controller 90 is connected with the torque sensor 40 and the rotation angle sensor 50, and controls the current regulator 80 according to the amount of torque from the torque sensor 40 to control the amount of current supplied to the cores 34.

Again in FIG. 5B, a reference numeral 39 designates the direction of lines of magnetic field.

Figure 6:
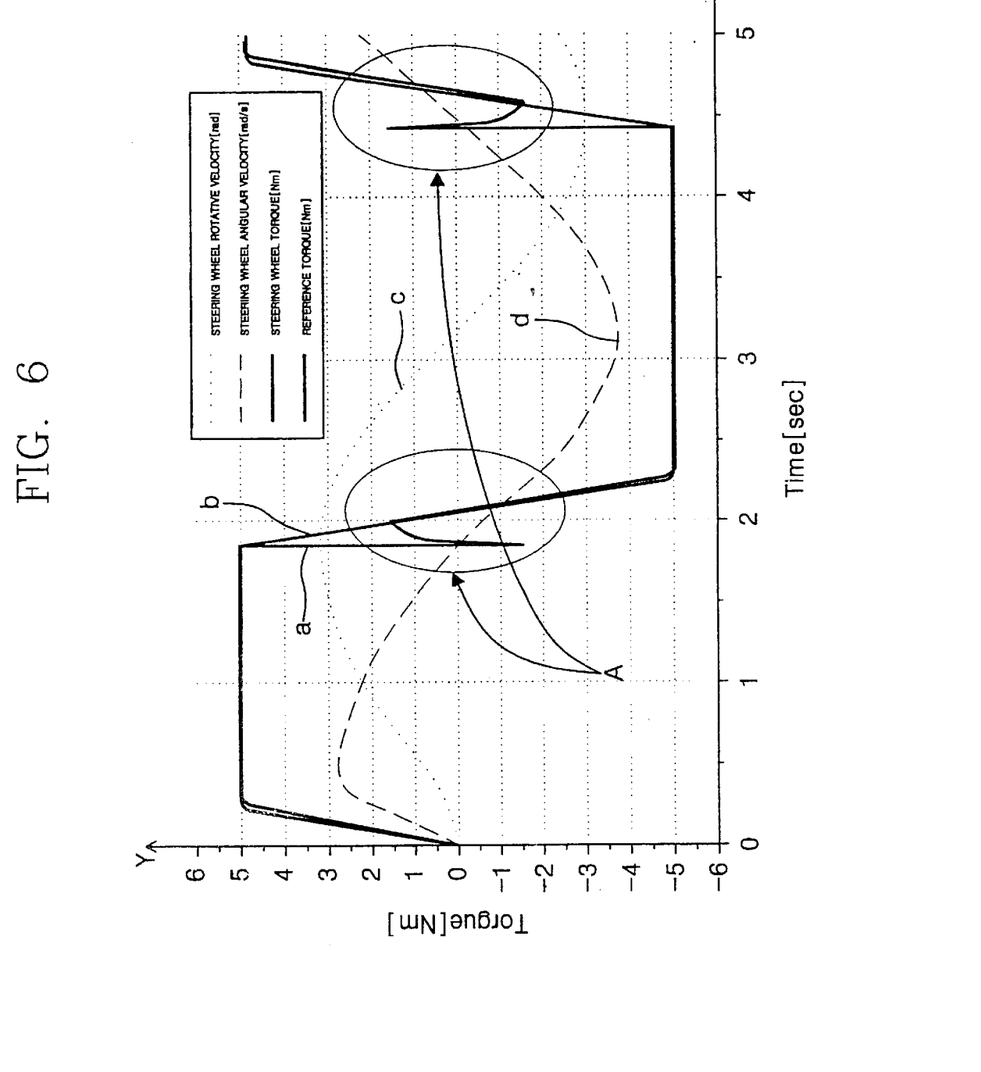
FIG. 6 is a graph for showing simulation results of the reference steering torque and steering torque about given steering wheel angular velocity inputs according to the first embodiment of the invention.

FIG. 6 is a graph for showing simulation results of the reference steering torque and steering torque for given steering wheel angular velocity inputs according to the first embodiment of the invention.

The magneto-rheological brake 30, which provides steering reaction force to the steering wheel 10 to make the driver feel a suitable amount of steering force, is controlled with the amount of current by the controller 90 according to an angular velocity d and a rotation angle c to generate steering torque a similar to the predetermined reference steering torque b. Here, the X axis indicates time (sec) and the Y axis indicates torque (Nm) for showing variation of the reference steering torque b and steering torque a according to time.

Also, the controller 90 receives rotational displacement data from the rotation angle sensor 50 for detecting the rotation angle c of the steering wheel so as to control a wheel steering motor 110 of the steering system connected with the controller 90.

Embodiment 2

Figure 7:
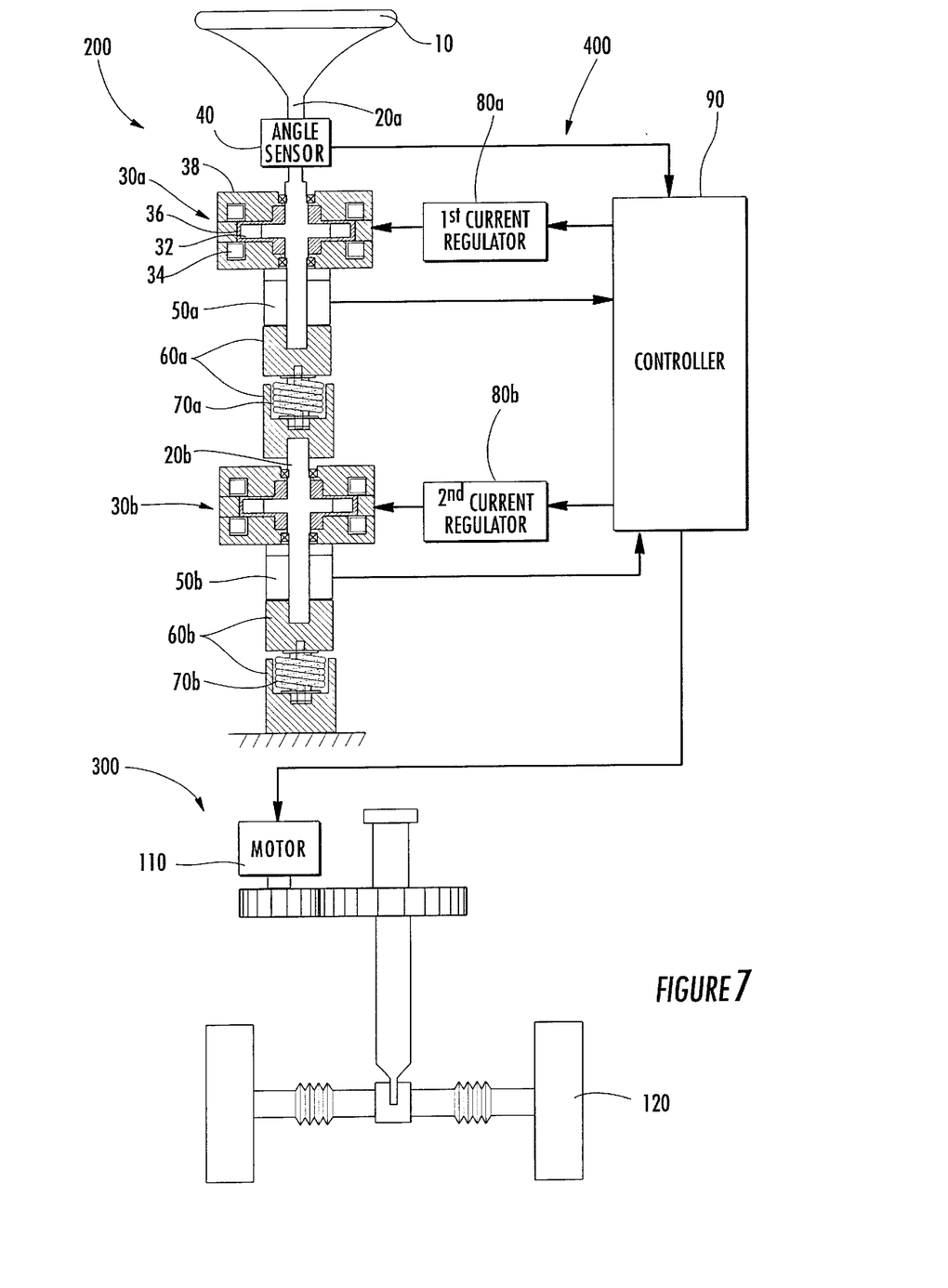
FIG. 7 shows a general structure of a steer-by-wire system using a semi-active actuator according to the second embodiment of the invention.

FIG. 7 shows a general structure of a steer-by-wire system using a semi-active actuator according to the second embodiment of the invention.

A steering wheel 10 of the steer-by-wire system using the semi-active actuator according to the embodiment further comprises another steering column under a steering column 20, where a magneto-rheological brake 30, a rotation angle sensor 50 and torsion coil springs are additionally provided. Although the steering wheel 10 of this embodiment has an operating principle similar to that of the first embodiment, torque of the steering wheel 10 is realized more similarly to the predetermined reference steering torque b.

In other words, when force-feedback control is carried out by using the magneto-rheological brake 30 which is the. semi-active actuator, there is a constraining condition that only the driver can provide energy to the steer-by-wire system and the magneto-rheological brake 30 can only dissipate energy of the steer-by-wire system without applying energy to the same. Under this constraining condition, there is restriction in the range of reaction force which can be expressed by using the steering wheel 10, since the actuator is passively constrained, as can be seen from A parts in FIG. 6. Hereinafter, the A parts which are restricted in obtaining reaction force will be referred to as passive constraint ranges. In the second embodiment, these passive constraint ranges A are minimized so that steering torque desired to be realized can approach the reference steering torque b.

As shown in FIG. 7, a steering wheel operator unit 200 has a ring-shaped steering wheel 10 for the driver to hold and rotate the same clockwise and counter clockwise to input steering operations, and a rod-shaped first steering column 20a vertically connected to the center of the steering wheel 10 for supporting rotation of the steering wheel 10. A second steering column 20b is collinearly connected under the first steering column 20a via first torsion springs 70a, which is mounted first jigs 60a at both ends thereof. Also, second torsion springs 70b are connected between the lower part of the second steering column 20b and the vehicle body via second jigs 6b mounted to both ends thereof.

In other words, the first steering column 20a is connected to the center of the steering wheel 10, the first torsion springs 70a are connected to the lower end of the first steering column 20a, the second steering column 20b is connected to the lower end of the first torsion spring 70a, the second torsion spring 70b is connected to the lower end of the second steering column 20b, and second torsion springs 70b are connected to the vehicle body so that a straight line is defined between the steering wheel 10 and a portion of the vehicle body connected to the second torsion springs 70b.

The steering system has a first magneto-rheological brake 30a which installed in a middle area of the first steering column 20a and has a plurality of cores 34 and a magneto-rheological fluid 36. Also, a torque sensor 40 is coupled with one end of the first steering column 20a to detect the amount of torque of the steering wheel 10, and a first rotation angle sensor 50a is coupled with one end of the first steering column 20a to detect angle displacement of the steering wheel.

Also, a second magneto-rheological brake 30b is installed in a middle area of the second steering column 20b, and includes a rotor 32, a plurality of cores 34 and a magneto-rheological fluid 36. A second rotation angle sensor 50b is coupled with one end of the second steering column 20b to detect angle displacement of the second steering column 20b.

Thus, the first magneto-rheological brake 30a and the second magneto-rheological brake 30b are configured as shown in FIG. 3 of the first embodiment, and the first torsion springs 70a and the second torsion springs 70b are configured as shown in FIG. 4.

A current regulating unit 400 includes a first current regulator 80a for powering the first magneto-rheological brake 30a to control resistance force against rotation of the first magneto-rheological brake 30a and a second current regulator 80b for powering the second magneto-rheological brake 30b to control resistance force against rotation of the second magneto-rheological brake 30b.

Also, the steering system comprises a controller 90 for receiving values from the torque sensor 40, the first rotation angle sensor 50a and the second rotation angle sensor 50b to control the amount of current of the first current regulator 80a and the second current regulator 80b and to control a wheel steering motor 110.

According to the embodiment of the invention, the first torsion springs 70a as energy storing components are connected between the first magneto-rheological brake 30a and the second magneto-rheological brake 30b for reducing the passive constraint ranges A so that energy applied by the driver can be stored in the first torsion springs 70a to vary the range of reaction force which is realizable.

Here, steering reaction force sensed by the driver is mainly composed of torque by the first torsion springs 70a and the first magneto-rheological brake 30a, in which the second magneto-rheological brake 30b is controlled so that the reference steering torque b is generated only from torque by the first torsion springs 70a, and the first magneto-rheological brake 30a generates the same amount of torque as the difference between the reference steering torque b and torque by the first springs 30a.

In other words, torque of the first torsion springs 70a is calculated as $(\theta 1-\theta 2) \times K$, wherein $\theta 1$ is a rotation angle of the first steering column 20a, $\theta 2$ is a rotation angle of the second steering column 20b, and K is a spring constant. Therefore, the second magneto-rheological brake 30b controls the amount of relative angle displacement $(\theta 1-\theta 2)$ so that the first torsion springs 70a generates torque similar to the reference steering torque b, and the second magneto-rheological brake 30a cancels as much torque as the difference between torque $K(\theta 1-\theta 2)$ of the first torsion springs 70a and the reference steering torque.

Figure 8:
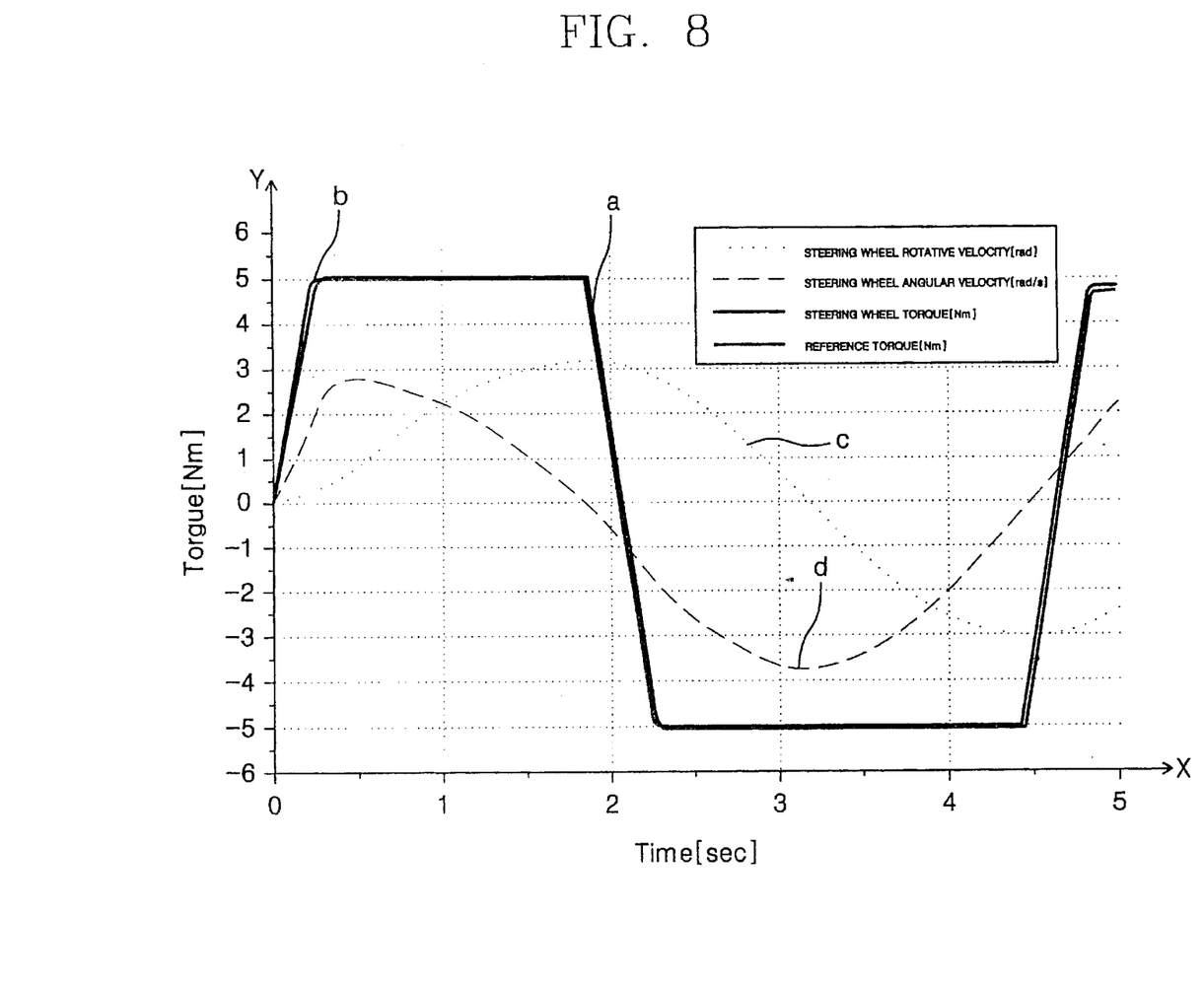
FIG. 8 is a graph for showing simulation results of the reference steering torque and steering torque for given steering wheel angular velocity inputs according to the second embodiment of the invention.

FIG. 8 is a graph for showing simulation results of the reference steering torque and torque of the steering wheel obtained for given steering wheel angular velocity inputs according to the second embodiment of the invention.

As described in reference to FIG. 6, the graph shown in FIG. 8 has an X axis for indicating time (sec), a Y axis for indicating torque (Nm), and shows variation of the reference steering torque b and steering torque a according to time.

Therefore, as shown in FIG. 8, steering torque a approximately follows the reference steering torque b while reducing the passive constraint ranges A to provide the driver with smooth reaction force.

Also, as in the first embodiment, the second torsion springs 70b have the double spring structure to provide the steering wheel 10 with restoring force as the steering wheel 10 is rotated, and have stiffness lower than that of the first torsion springs 70a. The controller 90 receives values of the first rotation angle sensor 50a, the second angle sensor 50b and the torque sensor 40 and controls the first current regulator 80a and the second current regulator 80b so that steering torque a may follow the reference steering torque b. Further, the controller 90 controls the wheel steering motor 110 of a steering actuator unit 300 according to an angle of the steering wheel 10 detected by the first rotation angle sensor 50a to steer the wheels 120 along a desired driving direction.

According to the steer-by-wire system using the semi-active actuator of the invention described hereinbefore, steering reaction force is suitably provided to the steering wheel by using the magneto-rheological brake as the semi-active actuator so that the driver can feel smoothness in steering. Also, the magneto-rheological brake(s) using the magneto-rheological fluid is/are employed to avoid acceleration of the steering wheel even if the steering input of the driver is suddenly removed, and accordingly stability can be ensured.

Further, since the steering wheel is provided with steering reaction force according to vehicle information without a mechanical connection with the vehicle wheels, the steering system can be widely applied to the vehicle and construction machinery industry, the virtual reality industry, the game industry and the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steer-by-wire system using a semi-active actuator, in which a wheel steering motor operates vehicle wheels when a steering wheel is rotated, said system comprising:

a steering operator unit having a steering column with one end vertically connected to a center of the steering wheel, a torsion spring connected between another end of said steering column and a vehicle body via jigs mounted to both ends thereof, a magneto-rheological brake for providing steering reaction force according to an amount of current, a rotation angle sensor coupled with one end of said steering column for detecting rotation of said steering wheel, and a torque sensor coupled with one end of said steering column for detecting torque of said steering wheel;

a current regulator for controlling resistance force against rotation of said magneto-rheological brake; and a controller for controlling said current regulator according to torque data from said torque sensor, and controlling the wheel steering motor according to rotational displacement data from said rotation angle sensor.

2. The steer-by-wire system using a semi-active actuator according to claim 1, wherein said magneto-rheological brake has a rotor fixed to an outer periphery of said steering column, a plurality of cores spaced apart from said rotor by a predetermined interval and wound with coils, and a housing spaced apart from said rotor by a predetermined interval for receiving said rotor and said plurality of cores, wherein said rotor, said plurality of cores and said housing define a space for containing a magneto-rheological fluid.

3. The steer-by-wire system using a semi-active actuator according to claim 2, wherein said housing is fixed to the vehicle body to support rotation of said steering wheel.

4. The steer-by-wire system using a semi-active actuator according to claim 1, wherein said torsion spring has a double structure of springs connected in parallel, one of said springs having a diameter and a spiral direction different from those of the other.

5. The steer-by-wire system using a semi-active actuator according to claim 1, wherein said jigs are a pair arranged in a column, one of said jigs being centrally fixed to the steering wheel, and the other one of said jigs being fixed to the vehicle body.

6. A steer-by-wire system using a semi-active actuator, in which a wheel steering motor operates vehicle wheels when a steering wheel is rotated, said system comprising:

a steering operator unit having a first steering column vertically connected, to a center of the steering wheel, a second steering column connected to said first steering column, a first torsion spring connected between said first steering column and said second steering column via first jigs mounted to both ends thereof, a second torsion spring connected between said second steering column and a vehicle body via second jigs mounted to both ends thereof, a first magneto-rheological brake for comparing torque by said first torsion spring with a reference steering torque and providing resistance force to compensate for an error, a second magneto-rheological brake mounted to said second steering column for regulating torque by said first torsion spring, a first rotation angle sensor coupled with one end of said first steering column for detecting angle displacement of the steering wheel, a second rotation angle sensor coupled with one end of said second steering column for detecting angle displacement of said second steering column, and a torque sensor coupled with one end of said first steering column for detecting torque of the steering wheel;

a current regulating unit having a first current regulator for controlling resistance force against rotation of said first magneto-rheological brake, and a second current regulator for controlling resistance force against rotation of said second magneto-rheological brake; and a controller for receiving data of said torque sensor, said first rotation angle sensor and said second rotation angle sensor to control an amount of current of said first current regulator and said second regulator and to control the wheel steering motor.

7. The steer-by-wire system using a semi-active actuator according to claim 6, wherein said first magneto-rheological brake has a rotor fixed to an outer periphery of said first steering column, a plurality of cores spaced apart from said rotor by a predetermined interval and wound with coils, and a housing spaced apart from said rotor by a predetermined interval for receiving said rotor and said plurality of cores, said rotor, said plurality of cores and said housing defining a space for containing a magneto-rheological fluid; and wherein said second magneto-rheological brake has a rotor fixed to an outer periphery of said second steering column, a plurality of cores spaced apart from said rotor by a predetermined interval and wound with coils, and a housing spaced apart from said rotor by a predetermined interval for receiving said rotor and said plurality of cores, said rotor, said plurality of cores and said housing defining a space for containing a magneto-rheological fluid.

8. The steer-by-wire system using a semi-active actuator according to claim 7, wherein said housing is fixed to the vehicle body to support rotation of said steering wheel.

9. The steer-by-wire system using a semi-active actuator according to claim 6, wherein said first torsion spring has a double structure of springs connected in parallel, one of said springs having a diameter and a spiral direction different from those of the other.

10. The steer-by-wire system using a semi-active actuator according to claim 6, wherein said second torsion spring has a double structure of springs connected in parallel, one of said springs having a diameter and a spiral direction different from those of the other.

11. The steer-by-wire system using a semi-active actuator according to claim 6, wherein said second torsion spring has a stiffness lower than that of said first torsion spring means.

12. The steer-by-wire system using a semi-active actuator according to claim 6, wherein said, first jigs are arranged in a column, a first one of said first jigs being centrally fixed to the steering wheel, a second one of said first jigs being centrally fixed to the vehicle body.

13. The steer-by-wire system-using a semi-active actuator according to claim 6, wherein said second jigs are arranged in a column, a first one of said second jigs being centrally fixed to the steering wheel, a second one of said second jigs being centrally fixed to the vehicle body.

* * * * *